(12) United States Patent
Buck

(10) Patent No.: US 11,900,454 B2
(45) Date of Patent: Feb. 13, 2024

(54) SYSTEM AND METHOD FOR MODIFYING TRADING STRATEGIES BASED ON MESSAGE USAGE

(71) Applicant: Trading Technologies International, Inc., Chicago, IL (US)

(72) Inventor: Brian J. Buck, Livermore, CA (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

(21) Appl. No.: 14/261,411

(22) Filed: Apr. 24, 2014

(65) Prior Publication Data

US 2014/0236800 A1    Aug. 21, 2014

Related U.S. Application Data

(63) Continuation of application No. 12/917,310, filed on Nov. 1, 2010, now Pat. No. 8,744,954, which is a continuation of application No. 11/027,314, filed on Dec. 30, 2004, now Pat. No. 7,848,991.

(51) Int. Cl.
*G06Q 40/04* (2012.01)

(52) U.S. Cl.
CPC .................. *G06Q 40/04* (2013.01)

(58) Field of Classification Search
CPC ............... G06Q 40/04; G06Q 40/06
USPC ........................................... 705/37
See application file for complete search history.

(56) References Cited

U.S. PATENT DOCUMENTS

| | | | |
|---|---|---|---|
| 4,363,489 A | 12/1982 | Chodak et al. | |
| 6,996,393 B2 | 2/2006 | Pyhalammi et al. | |
| 7,124,110 B1* | 10/2006 | Kemp et al. | 705/37 |
| 7,136,834 B1 | 11/2006 | Merrin et al. | |
| 7,379,909 B1* | 5/2008 | Cruz et al. | 705/35 |
| 7,848,991 B1 | 12/2010 | Buck | |
| 7,848,993 B1 | 12/2010 | Buck | |
| 2003/0200167 A1* | 10/2003 | Kemp et al. | 705/37 |
| 2003/0236737 A1 | 12/2003 | Kemp, II et al. | |
| 2004/0019553 A1 | 1/2004 | Setz et al. | |
| 2005/0102219 A1 | 5/2005 | Taylor et al. | |
| 2011/0047065 A1 | 2/2011 | Buck | |

* cited by examiner

*Primary Examiner* — Jessica Lemieux
(74) *Attorney, Agent, or Firm* — McDonnell Boehnen Hulbert & Berghoff LLP

(57) ABSTRACT

A system and method are provided for implementing an electronic exchange-based transaction message policy. One example method includes defining a message usage threshold to be used in relation to a client entity that utilizes one or more trading strategies and sends transaction messages to an electronic exchange. The method further includes dynamically monitoring the message usage at the client entity and comparing it to the defined message usage threshold. If the message usage exceeds the threshold limit, the method includes adjusting one or more trading strategies at the client entity in attempt to not violating the exchange-based transaction message policy.

18 Claims, 3 Drawing Sheets

SYSTEM AND METHOD FOR MODIFYING TRADING STRATEGIES BASED ON MESSAGE USAGE

CROSS REFERENCE TO RELATED APPLICATIONS

This application is a continuation of U.S. patent application Ser. No. 12/917,310, filed Nov. 1, 2010, now U.S. Pat. No. 8,744,954, which is a continuation of U.S. patent application Ser. No. 11/027,314, filed Dec. 30, 2004, now U.S. Pat. No. 7,848,991, the contents of each of which are fully incorporated herein by reference for all purposes.

TECHNICAL FIELD

The present invention is directed to electronic trading. More specifically, the present invention is directed to modifying trading strategies based on transaction message usage.

BACKGROUND

An exchange is a central marketplace with established rules and regulations where buyers and sellers, referred to as traders, meet to trade. Some exchanges, also called open outcry exchanges, operate using a trading floor where traders physically meet on the floor to trade. Other exchanges, referred to as electronic exchanges, operate by an electronic or telecommunications network instead of a trading floor to facilitate trading in an efficient, versatile, and functional manner. Electronic exchanges have made it possible for an increasing number of people to actively participate in a market at any given time. The increase in the number of potential market participants has advantageously led to, among other things, a more competitive market and greater liquidity.

With respect to electronic exchanges, traders may log onto an electronic exchange trading platform by way of a communication link through their user terminals. Once connected, traders may typically choose which tradeable objects they wish to trade. As used herein, the term "tradeable object" refers to anything that can be traded with a quantity and/or price. It includes, but is not limited to, all types of traded events, goods and/or financial products, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable objects, such as a class of tradeable objects.

An electronic exchange typically provides a matching process between offers to sell and bids to buy a tradeable object. Some example exchanges are Eurex, LIFFE, CME, and CBOT. Trading entities are typically connected to an electronic exchange by way of a communication link to facilitate electronic messaging between the trading entities and the exchange. The messaging may include orders, quotes, acknowledgements, fills, cancels, deletes, cancel and replace, and other well-known financial transaction messages.

Many exchanges impose limits or restrictions on the communication/transaction messages that are received from buyers and sellers. The limits are generally intended to ensure that the exchanges' computer system is not overburdened, and to dissuade buyers and sellers from submitting excessive or unnecessary messages that could possibly limit order execution capacity and strategy capabilities of the dynamic exchange systems. For instance, one limit may include a cap on the number of any "in-flight" messages (which may include messages that have been submitted to the exchange, but the exchange has not yet provided a return confirmation receipt). In another example, a limit may be based on fill percentages, (e.g., a number of fills compared to the total number of transaction messages sent to the exchange). A fill is a message from an exchange indicating that an order has matched another order in the market, and that a trade has now been consummated. The exchange preset limits may be enforced in many various manners. For example, an exchange may charge a fee when a specified message limit has been reached or when a percentage fill is lower than a specified percentage.

Yet, another limit may be on the number of transactions submitted by a member in a given time period. Orders are often revised and resubmitted by traders to reflect changes in their desired positions. Traders may revise their transactions to reflect even small changes in the market, and when prices in the market move rapidly, this may result in a large number of transactions being submitted to the exchange. Excessive quoting (which refers to any type of transaction including orders and quotes) can place a burden on the exchange.

Also, with an increased use of automated trading tools, reaching or exceeding these limits may occur rather easily. Indeed, the use of such tools can easily overburden an exchange's message handling capacity or processing capability. It is therefore desirable for electronic trading system to offer tools that can be used to control message traffic in view of limited resources protected by message policies that are set by an electronic exchange.

BRIEF DESCRIPTION OF THE DRAWINGS

Example embodiments of the present invention are described herein with reference to the following drawings, in which.

DETAILED DESCRIPTION

Figure 1:
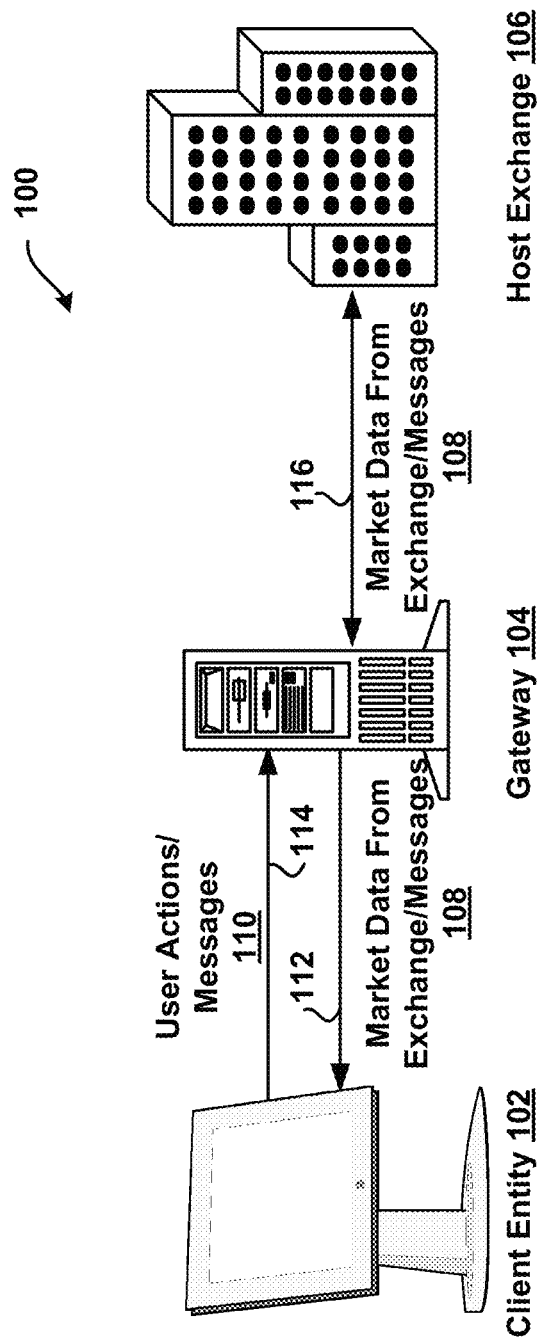
FIG. 1 is a block diagram illustrating an example network configuration for a communication system utilized to access one or more exchanges.

I. Managing Transaction Messages Based on Message Usage

System and methods are provided, among other things, to facilitate managing transaction messages based on exchange-based message use policies. According to one example method, a trader or an administrator may define one or more message usage thresholds to be used in relation to a client entity, such as a client terminal associated with a single trader, or a group of client terminals associated with a plurality of traders. Alternatively, the message usage threshold can be dynamically set based on a threshold level being received from an electronic exchange. In an example embodiment, the client entity utilizes one or more trading strategies for trading at an electronic exchange, and sends transaction messages to the electronic exchange. A message usage threshold can be based on a certain limit, such as the number of transaction messages that are sent from the client entity, and/or a fill percentage associated with the client entity, or yet some other transaction message measurement.

The example method further includes dynamically monitoring message usage associated with the client entity based on the defined message usage threshold. In one embodiment, the step of monitoring the message usage may include monitoring the total number of messages being sent and/or a total number of fills, and calculating a fill percentage associated with the client entity. The method then includes comparing the message usage to the predefined thresholds. Based on the comparison, the method may then include dynamically adjusting one or more trading strategies being used at the client entity in attempt to not violate the message use policy at the electronic exchange. For example, the adjustments may result in lowering the number of messages being sent from the client entity, or increasing the number of fills for the client entity.

While the example embodiments are described herein with reference to illustrative embodiments for particular applications, it should be understood that the example embodiments are not limited thereto. Other systems, methods, and advantages of the present embodiments will be or become apparent to one with skill in the art upon examination of the following drawings and description. It is intended that all such additional systems, methods, features, and advantages be within the scope of the present invention, and be protected by the accompanying claims.

II. Hardware and Software Overview

As will be appreciated by one of ordinary skill in the art, the example embodiments may be operated in an entirely software embodiment, in an entirely hardware embodiment, or in a combination thereof. However, for sake of illustration, the preferred embodiments are described in a software-based embodiment, which is executed on a computer device. As such, the example embodiments take the form of a computer program product that is stored on a computer readable storage medium and is executed by a suitable instruction system in the computer device. Any suitable computer readable medium may be utilized including hard disks, CD-ROMs, optical storage devices, or magnetic storage devices, for example.

In an electronic trading environment, when a trader selects a tradeable object, the trader may access market data related to the selected tradeable object(s). Referring to FIG. 1, an example communication that might occur between an electronic exchange and a client entity in accordance with the preferred embodiments is shown. During a trading session, market data 108, in the form of messages, may be relayed from a host exchange 106 over communication links 116 and 112 to a client entity generally indicated as 102. The client entity 102 may be a single client terminal being used by a single trader or multiple client terminals corresponding to multiple traders associated with one or more trading groups. As illustrated in FIG. 1, intermediate devices, such as gateway(s) 104, may be used to facilitate communications between the client entity 102 and the host exchange 106. It should be understood that while FIG. 1 illustrates the client entity 102 communicating with a single host exchange 106, in an alternative embodiment, the client entity 102 could establish trading sessions to more than one host exchange. Also, it should be understood that information being communicated between the client entity 102 and the exchange 106 could be communicated via a single communication path.

The market data 108 contains information that characterizes the tradeable object's order book including, among other parameters, order related parameters, and the inside market, which represents the lowest sell price (also referred to as the best or lowest ask price) and the highest buy price (also referred to as the best or highest bid price). In some electronic markets, market data may also include market depth, which generally refers to quantities available for trading the tradeable object at certain buy price levels and quantities available for trading the tradeable object at certain sell price levels.

In addition to providing the tradeable object's order book information, electronic exchanges can offer different types of market information such as total traded quantity for each price level, opening price, last traded price, last traded quantity, closing price, or order fill information. It should be understood that market information provided from an electronic exchange could include more or fewer items depending on the type of tradeable object or the type of exchange. Also, it should be understood that the messages provided in the market data 108 may vary in size depending on the content carried by them, and the software at the receiving end may be programmed to understand the messages and to act out certain operations.

A trader may view the information provided from an exchange via one or more specialized trading screens created by software running on the client entity 102. Upon viewing the market information or a portion thereof, a trader may wish to take actions, such as send orders to an exchange, cancel orders at the exchange, or change order parameters, for example. To do so, the trader may input various commands or signals into the client entity 102. Upon receiving one or more commands or signals from the trader, the client entity 102 may generate messages that reflect the actions taken, generally shown at 110. It should be understood that different types of messages or order types can be submitted to the host exchange 106, all of which may be considered various types of transaction information. Once generated, user action messages 110 may be sent from the client entity 102 to the host exchange over communication links 114 and 116.

III. Example System Function and Operation

The example system and methods can be used in situations when an electronic exchange imposes limits on message submissions and applies charges when message submission from a client entity exceeds the specified limit. The example system and methods may assist the trader to become aware of and pay attention to a number of messages that are sent to an electronic exchange from a client entity, and then to dynamically or manually change his trading strategies to avoid exchange-imposed fees.

It should be understood that an electronic exchange can impose different message usage limits. The example embodiments will be described in reference to one such message usage limitation: a fill percentage threshold. A fill percentage is the percentage of the total number of transaction messages that results in a matched trade, and can be calculated by dividing the total number of fill messages (including any partial fills) by the total number of transaction messages. In one embodiment, the total number of fills may be determined based on fill confirmation messages that are received from an exchange. An example of a partial fill is where a trader has submitted an order to buy a quantity of 10 at a certain price level, and the exchange has matched this buy with a sell order for a quantity of 5. According to this example, the exchange sends a message indicating a "partial fill" of quantity 5 to the trader. As used herein, a transaction message may be any message that is sent from a client entity to an electronic exchange, including, but not limited to, any submits, pulls, and revisions. While the example embodiments will be described in reference to the fill percentage, it should be understood that an electronic exchange could impose different message usage limits as well. Some message usage limits can include a number of transaction messages per second that a client entity is allowed to sent without incurring any charges, a total number of transaction messages during a trading day, a number of "in-flight" transaction messages (e.g., transaction messages that are submitted to an exchange, but have not yet been acknowledged by the exchange), a number of data bytes per second, or a total number of bytes allowed to be sent from a client entity to an electronic exchange during a trading day. Different limits could be defined as well.

Figure 2:
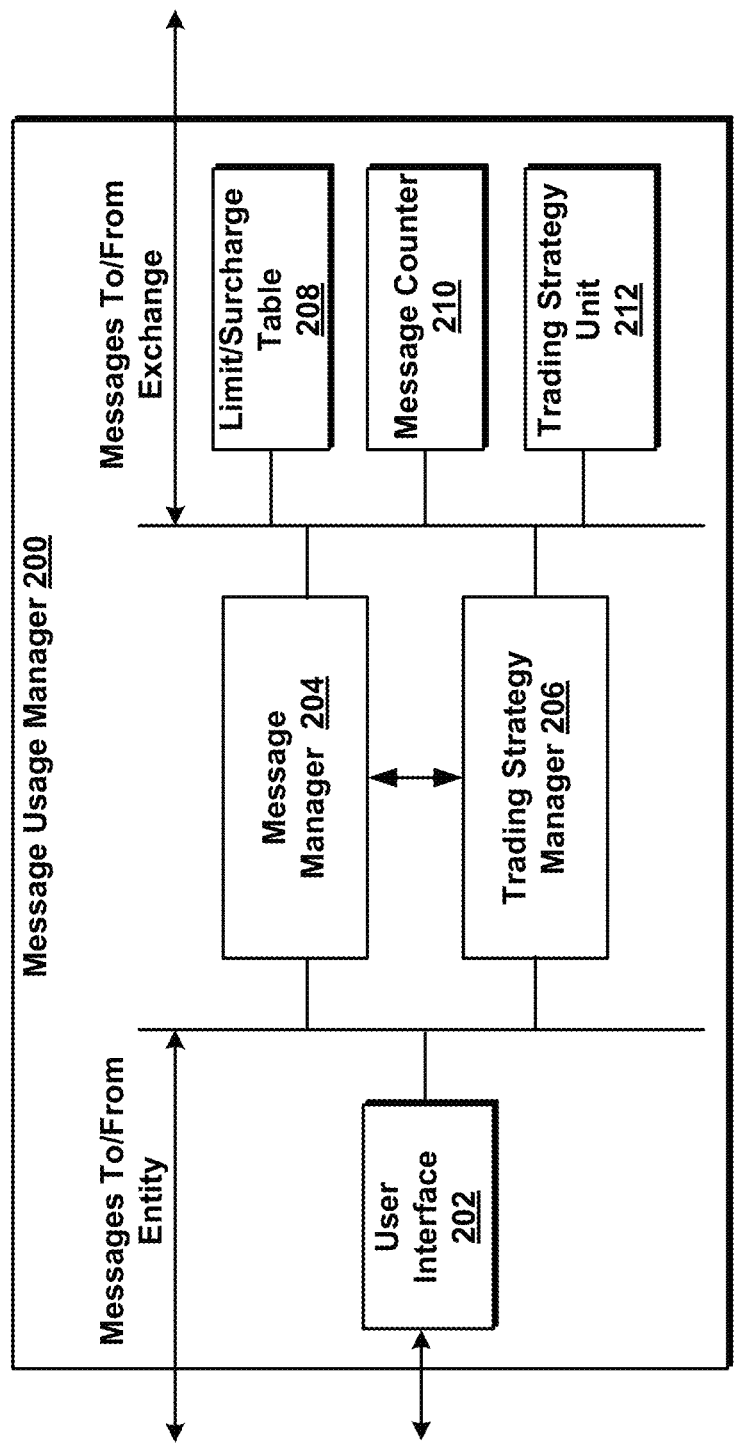
FIG. 2 is a block diagram illustrating an example embodiment of a system for prioritized automated trading.

FIG. 2 is a block diagram illustrating an example message use manager 200 that can be used to manage trading strategies based on message usage at a client entity. The message use manager 200 can be implemented on any entity in communication with one or more electronic exchanges and client entities. As an example, the message use manager 200 could be located at a gateway, such as the gateway 104 illustrated in FIG. 1. The functionality of the message use manager 200 could be alternatively distributed between multiple devices, or it could be at the client entity. It should be understood that the message use manager 200 can be configured to manage trading strategies corresponding to multiple client entities, while the multiple client entities can access multiple exchanges having different message usage policies.

The message use manager 200 includes a user interface 202 that can be used to define message usage thresholds. For example, a system administrator or a trader could use the user interface 202 to define message usage threshold to be applied in relation to one or more client entities. Alternatively, message usage thresholds can be automatically updated at the message use manager 200 based on data being provided by an exchange. The message usage thresholds could be provided in data feeds that are sent from an exchange to client entities. In such an embodiment, if an exchange modifies its message usage policy during a trading day, the corresponding values can be automatically updated at the message use manager 200 based on the information provided in the data feed.

As mentioned in earlier paragraphs, an exchange may implement a message use policy by defining fill percentages. Table 1 illustrates one example message use policy.

TABLE 1

| Fill Percentage | Message Submission Per Contract/Per Trading Day |
| --- | --- |
| Greater than 10% | No limits |
| Less than 10% | Order cap 8,000 |
| Less than 0.5% | Greater than 500 messages |

According to the message use policy defined in Table 1, a client entity that exceeds 8,000 messages with less than 10% fill percentage, or exceed 500 messages with less than 0.5% fill percentage will incur message submission charges. Table 2 illustrates an example set of charges that could be applied by an exchange when a client entity exceeds the allowed message usage with insufficient fill percentage.

TABLE 2

| Message Usage | Surcharge |
| --- | --- |
| 100%-110% of message submission cap | $ 0.10 per message |
| 111%-120% of message submission cap | $ 0.20 per message |
| 120% or greater | $ 0.25 per message |

It should be understood that the message use policy as well as the charges for exceeding the accepted message usage (such as shown in Table 1 and Table 2) are only examples, and, depending on the exchange, different message use policies as well as surcharges could be used as well. The message use policies and the accompanying surcharges can be stored in the Limit/Surcharge Table 208.

The message use manager 200 also includes a message manager 204 that can be used to implement a message use policy. The message manager 204 may track message flow for each client entity being supported by or registered at the message use manager 200. In one embodiment, a message counter 210 may calculate a number of messages being sent from one or more client entities during a predefined time period, and then dynamically update a message counter corresponding to each entity. If a message use policy being used by an electronic exchange is based on a fill percentage policy, the message counter 210 can also monitor and keep track of a number of fills, and dynamically calculate a fill percentage for each client entity. The message manager 204 can also dynamically provide message submission data, such as a fill percentage and/or a message count, for each trader and/or a system administrator associated with a group of traders. In one example embodiment, the message submission data can be dynamically displayed to each trader on a trading screen. Also, an alert system can be implemented at the message manager 204 to alert a user when a message count or a fill percentage is close to a predefined threshold. Additionally, when a trader exceeds the preset message submission limits, the message manager 204 could also provide the current estimate of charges. Alternatively, an exchange could provide a warning message when a client entity is close to violating the exchange-defined threshold.

A trader could also use the interface 202 to specify one or more rules to be used to modify a trading strategy in response to detecting that the message usage at a client entity exceeds a predetermined message threshold specified in the limit table 208. It should be understood that a trader could define his own threshold limits in relation to the trading strategy modification rules. In such an embodiment, the trader-defined threshold limits could be lower than the exchange-defined limits so that the trading strategy modification rules can be triggered early enough to avoid possible charges. For example, a trader could specify a percentage that can be used in relation to the exchange-defined threshold values to calculate user-preferred numbers for triggering trading strategy modification rules. In such an embodiment, even when an exchange changes its limits, the same percentages could be used to determine new trigger points. It should be understood that different embodiments are possible as well.

It should be understood that different threshold limits could be defined as well. For example, rather than defining global threshold levels to be used across all applications, a trader or a system administrator could set up threshold levels in association with each software application. In one embodiment, a trader could define a threshold level for an auto-spreader trading application, and another threshold level for an auto-trader application. In such an embodiment, the message use manager 200 could control the message count or fill percentage corresponding to each application and modify the trading strategy corresponding to each application that has reached a predetermined threshold limit so that a trader can have a greater control over which trading strategies will be modified. Threshold levels could be tradeable object specific as well.

More information relating to the auto-spreader application and auto-trader application can be found in U.S. patent application Ser. No. 10/137,979, entitled "System and Method for Performing Automatic Spread Trading," filed on May 3, 2002, and U.S. patent application Ser. No. 10/284,584, entitled "System and Method for Automated Trading," filed on Oct. 31, 2002, both of which are fully incorporated herein by reference.

The message use manager 200 also includes a trading strategy manager 206 and a trading strategy unit 212. The trading strategy unit 212 may store a number of trading strategy modification rules to be applied in relation to the trading strategies being used at one or more client entities at the time when the trigger(s) are detected. The trading strategy unit 212 could also store a new set of trading strategies to be applied in relation to a client entity when one or more message use triggering events are detected. It should be understood that the trading strategy modification rules may be of many different formats and functions. In general, if a message use policy at an electronic exchange is based solely on the number of messages being submitted by a client entity, the trading strategy modification rules may be configured to control and lower the number of messages being sent from a client entity. Alternatively, if a message use policy at an electronic exchange is based on a fill percentage, the trading strategy modification rules can be configured to increase the number of fills associated with a client entity, and/or decrease the overall number of messages being submitted from the client entity.

As mentioned in the preceding paragraphs, many different methods and trading strategy modification rules could be used to adjust a trading profile being used by a trader, and the rules could be based on a trading strategy that is being used by the trader. In one embodiment, if the excessive number of message submission is primarily due to the use of an automatic trading application, such as an auto-spreader application or an auto-trader application, then, the trading profiles corresponding to these applications could be adjusted such that the applications would not make as many changes in relation to the submitted orders in response to the market movements or some other events. Such an implementation could involve a number of strategy modifications, such as totally shutting off some trading profiles that place orders far from where the market is actually trading, thereby, shutting off message submissions from a trading profile that submits a lot of orders with a very few fills.

Alternatively, in relation to an auto-spreader application, the trading strategy modification rules could adjust one or more spread trading parameters. Spread trading is buying and/or selling of two or more tradeable objects, with the purpose to capitalize on changes or movements in the relationships between the tradeable objects. A spread trade can involve buying two or more tradeable objects, buying and selling two or more tradeable objects, selling two or more tradeable objects, or some combination thereof. When a trader defines a spread, and the markets corresponding to each spread leg move, the price levels for the working orders in the legs need to change in order maintain a spread level being sought by the trader. In one embodiment, the auto-spreader application may automatically move the working orders in the legs based on the market movements. However, a trader may limit the number of times the auto-spreader will re-quote the legs by defining an acceptable range of prices to which the market can change before the auto-spreader will re-price the orders in each leg. Therefore, if the market moves, but is still within the acceptable range set by the user, the working orders in the legs will not be moved.

This acceptable range is often referred to as "slop." Generally, slop is a number that is based on units of change in whatever denomination the prices of the spread are calculated. In one embodiment, slop may be defined using two values: an inside slop value and an outside slop value. The inside slop value may define the worst price (the highest in the case of a spread bid and the lowest in the case of a spread offer) a user is willing to accept for a spread, and the outside slop generally defines the best price (the lowest in the case of a spread bid and the highest in the case of a spread offer) the user is willing to accept for the same spread. In general, the smaller the slop value, the smaller the slop range will be, which then causes the auto-spreader application to re-quote the legs more often as the market fluctuates. Typically, every time the auto-spreader application re-quotes the legs, a trading application would send messages to an exchange to account for working order cancellations and to place new orders based on the re-quoting of the spread legs. According to one example embodiment, the trading strategy manager 206 may automatically modify the slop to lower the number of messages that are being submitted as a result of constantly re-quoting the legs of the spread. To do that, the trading strategy manager 206 may increase the slop range being used by the auto-spreader in relation to one or more spreads. It should be understood that a trader could define an outside range to be used for the slop, and an alert could be generated and provided to the trader at some time before the limit is actually reached.

It should be understood that in relation to the methods that can be used to increase the fill percentage, the trading strategy manager 206 could adjust the trading strategy being used at a client entity gradually as a trader gets closer to violating the exchange-defined message usage policies. Also, different rules could be used as the client's fill percentage decreases, such that, for example, more aggressive rules could be applied to increase the client's fill percentage as the trader gets closer to violating the exchange-defined message submission policies, as compared to the rules that may only attempt to keep the client's fill percentage at a certain level. It should be understood that different trading strategies could be implemented to potentially allow a trader to make small profit while increasing the number of fills. For example, a trader could implement a trading strategy where a buy order could be placed at the market with stop loss orders being placed just below the market, and where a sell order would be placed on a small gain to increase the number of fills.

Rather than modifying the trading strategies being currently executed at the client entity, the trading strategy manager 206 may instead implement new strategies that will potentially result in generating a large number of fills. Such a new strategy would be beneficial in relation to a client entity communicating with an electronic exchange that implements a message use policy based on the fill percentages. In one example embodiment, the trading strategy manager 206 may implement trading strategies that may potentially result in an increased number of fills while achieving modest profit or loss. Such strategies may be used until the fill percentage increases to the level at which a trader no longer faces a significant risk of being fined for the non-compliance with the exchange's message submission guidelines. It should be understood that the process of submitting such orders may be manual or automatic. For example, a trader could be alerted first and then guidelines (or indicators) could be provided in relation to a trading interface or yet some other window as to where a trader could potentially enter new orders. Alternatively, the process could be fully automated, and an auto-trader application, or yet some other means, could be used to automatically submit the orders based on a plurality of trading rules that have been preconfigured by a trader at some earlier time.

It should be understood that in the embodiment where the trading strategy manager 206 attempts to increase a fill percentage corresponding to a client entity, the trading strategy manager 206 is not limited to increasing the number of fills in relation to the tradeable objects that a trader is currently trading. In one embodiment, the trading strategy manager 206 could attempt to increase the fill percentage by sending orders for tradeable objects other than those being traded by a trader. A trader could define one or more tradeable objects to be used by the trading strategy manager 206 to submit orders to an electronic exchange so that the number of fills is increased. It should be understood that the trading strategy manager 206 could have the capability to select one of the defined tradeable objects based on market conditions, such as market volatility, corresponding to each tradeable objects at the time when the trading strategy manager 206 attempts to apply a new trading strategy to increase the fill percentage. The selection process could be based on other conditions as well.

In one embodiment, a trader could submit orders to two or more electronic exchanges. The trader could then, over time (such as via an automatic process), attempt to flatten his/her net position at each exchange and make some profit at the same time. For example, a trader could send orders that are likely to be filled to an exchange at which a trader is at risk of non-compliance with message submission guidelines, while making the opposite trades (or nearly so) on another exchange which has similar or fungible tradeable objects. For example, a trader could buy a first tradeable object at the market price on Exchange "B" and then sell a second tradeable object at the market price on Exchange "S." If the tradeable being traded at the two exchanges were totally fungible, had common clearing, and the quantities bought and sold were the same, the trader's net position would be zero. If that was not the case, the trader would eventually want to sell the quantity bought at the Exchange "B" and buy the quantity sold at the Exchange S. If the two markets were moving totally in the lockstep, a trader would make no profit on the transactions. However, if an arbitrage opportunity would occasionally exist because the markets have not moved together in the lockstep, the trader could take advantage of that opportunity and potentially make a profit. A trader could have an automated routine that would sell at the Exchange B and buy at the Exchange S at the specified rate until such time as there are no net positions on either exchange due to the original buys/sells conducted on each exchange to increase the fill ratio. During such a process, the automated application could attempt to detect and take advantage of every arbitrage opportunities at each exchange.

Different methods could also be used in order to increase the overall fill percentage. For example, the trading strategy manager 206 could send orders for tradeable objects being traded by a trader at the time when a new trading strategy is applied, rather than sending orders for different tradeable objects. Also, it should be understood that the trading strategies could dynamically change based on any trader-defined conditions, including trader-related data, such as a trader's net position corresponding to each tradeable object being traded by the trader, trader's profit/loss ("P/L") level corresponding to each tradeable object, or some other conditions, such as market-related conditions, or the combination thereof.

For example, a trader or an automated trading application could first submit one or more orders to sell a tradeable object in relation to which the trader holds a long position at the market before any action is taken, and then, immediately upon receiving a fill, buy the same quantities of the tradeable objects at the same price or a different price, such as a better price than the sell price, to bring the trader's position to the previous level. Similarly, buy orders could be submitted for tradeable objects in relation to which a trader holds a short position before any action is taken. Then, a quick sell back can occur to bring the trader's position to the previous level. In such an embodiment, the trader can effectively increase the number of fills while there is a small likelihood of the market moving appreciably in the meantime. It should be understood that a trader could define many rules that could control submissions of the orders in relation to the tradeable objects being currently traded by the trader. For example, a trader may wish to apply the trading strategy described above when the market corresponding to a tradeable object is relatively slow. However, different embodiments are possible as well.

When a trading strategy is being selected to increase the fill ratio, the message manager 204 may factor in the cost of commission fees that a trader may possibly incur while modifying the trading strategy or implementing a new trading strategy. Preferably, a trading strategy that is developed by a trader to keep him compliant with message limits or fill percentages set by an exchange will not result in a cost that is greater than what the fines would be. In one example embodiment, before implementing any trading strategy, the trading strategy manager 206 may make any necessary calculations to determine if implementing the trading strategy may result in a higher cost to a trader as compared to the cost of paying the exchange fines. Such calculations could be performed when a trader sets up a trading strategy so that a trader can view a rough estimate of possible commission fees that could be the consequence of implementing the trading strategy. Alternatively, the calculations could be performed at the time when or right before the trading strategy manager 206 is to use the modified trading strategy. In either embodiment, a trader could view the calculations and modify the preconfigured trading strategies to lower the commission fees.

A trader could also define one or more rules that could be used to control the timing of modification of the trading strategies by the trading strategy manager 206. As mentioned earlier, any trading strategies being used at a client entity could be modified when a predefined threshold limit associated with a message use policy, such as a number of messages or a fill percentage, is detected. Alternatively, more than one threshold limit could be used so that the process of modifying trading strategies could be activated a number of times before a client entity becomes close to reaching the exchange-defined limits. Different embodiments are possible as well.

In addition, the trading strategy manager 206 could also provide one or more alerts before the trading strategy is actually modified. For example, an alert could be provided to warn a trader that a limit is almost reached. The trading strategy manager 206 could then automatically modify any trading strategies being used at the client entity based on earlier defined trader's preferences. Alternatively, the trading strategy manager 206 could wait for a command from a trader to enable the trading strategy manager 206 to apply any modifications to the trading strategies being currently used at the client entity or a specific trader.

Figure 3:
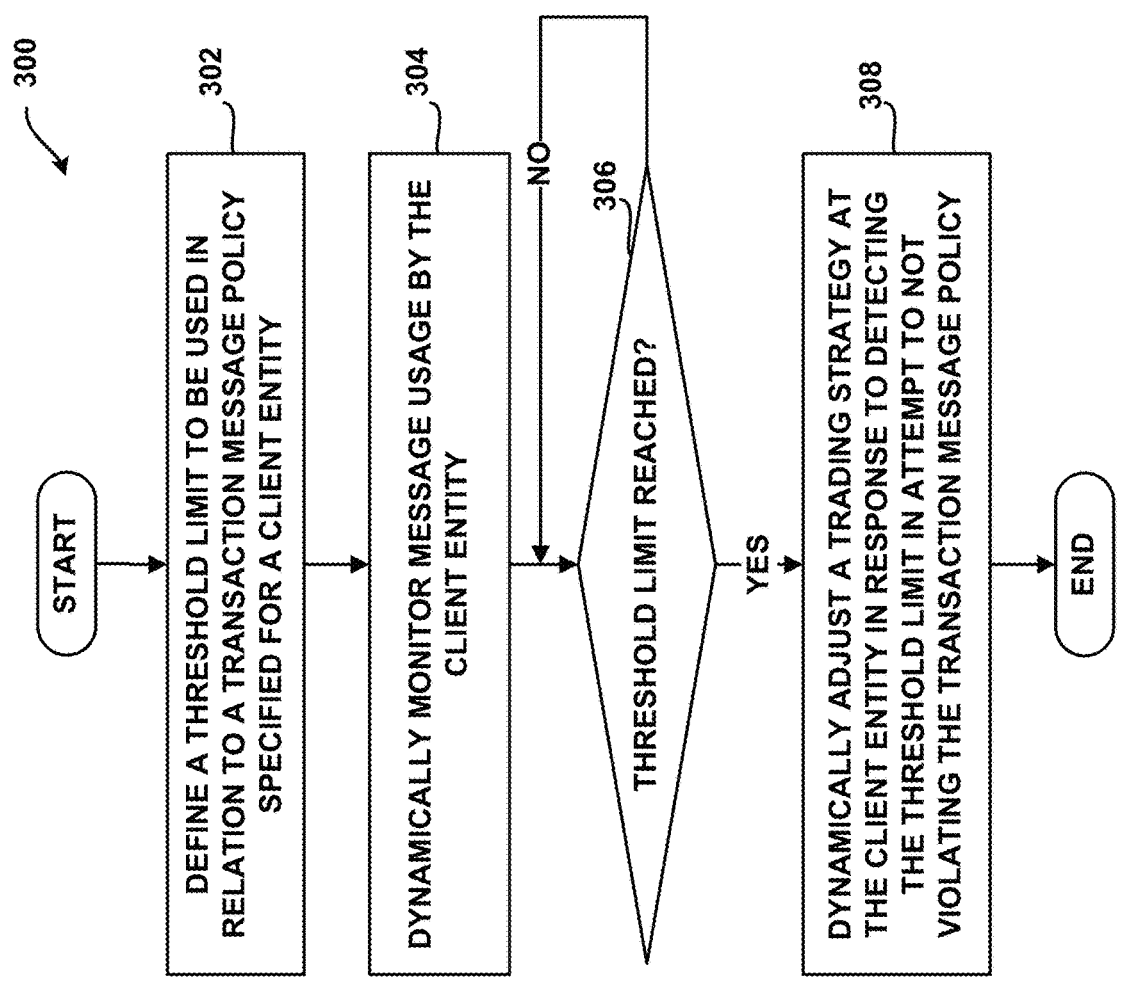
FIG. 3 is a flow chart illustrating an example embodiment of a method for managing transaction messages based on an exchange-based policy.

FIG. 3 is a flow diagram illustrating a method 300 for managing transaction messages based on message use policies dictated by an electronic exchange. It should be understood that each block may represent a module, segments, or portions of code, and may include one or more executable instructions for implementing specific logical functions or steps in the process. Alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention. The flow diagram 300 will be described in relation to the elements of the client terminal in FIG. 2. However, it should be understood that more, fewer, or different components could also be used to execute the method 300.

At step 302, a threshold limit is defined to be used in relation to a transaction message policy specified for a client entity. In one example embodiment, the transaction message policy is an exchange-based policy, and the client entity communicates with an exchange by sending transaction messages to the exchange and by receiving responses from the exchange. The transaction message policy could be based on the number of transaction messages that the client entity is allowed to send to the electronic exchange without incurring any penalty charges. Alternatively, the policy could be based on a combination of a fill percentage and a total number of messages being sent from the client entity to the exchange. Also, a system administrator or a trader himself could set up threshold levels, and the threshold levels defined at the message manager 204 could be lower than those specified by the exchange so that the client entity may attempt to modify a trading strategy early enough before violating the transaction message policy set up at an exchange. It should be understood that more than one threshold limit could be defined if the client entity is involved in trading at more than one exchange.

At step 304, the message manager 204 dynamically monitors transaction message usage at the client entity. In one embodiment, the message counter 210 may dynamically determine a total number of transaction messages as they are being sent from the client entity. Alternatively, or additionally, the message manager 204 could determine a fill percentage associated with the client entity based on the number of transaction messages that are sent from the client entity, and the number of fills detected in relation to the client entity.

At step 306, the message manager 204 determines if the client entity has reached the predefined threshold limit. If the client entity has not reached the threshold limit, the method continues at step 306, as shown in FIG. 3. When the message manager 204 detects that the threshold level has been reached, at step 308, the trading strategy manager 206 dynamically adjusts one or more trading strategies being used at the client entity in attempt to avoid paying transaction message policy violation fees. In general modification of the trading strategies may initiate the process of sending fewer transaction messages from the client entity and/or increasing the number of fills for the client entity. As explained earlier, different methods could be used to adjust the trading strategies being used at the client entity.

It is possible that an exchange could react to any trading strategy modification that a client entity attempts to implement to avoid paying message transmission fees. In one embodiment, an exchange may impose additional fees in response to a trader submitting a large number of orders to increase the trader's fill percentage. In such an embodiment, an exchange may run an application that can be used to detect that a trader is close to violating or has already violated message use policy limits, and then to detect that such a trader is executing a series of orders to raise the fill ratio in order to avoid exchange fines. Among other implementations that could be used by a trader to increase the number of fills, the application at the exchange may be configured to detect the submission of a large number of small lot size orders combined with stop orders, or buying and selling at the same or close prices within a short period of time. When the exchange makes such a determination, the exchange may impose additional fees or fines based on such modifications of the trading strategies.

The above description of the preferred embodiments, alternative embodiments, and specific examples, are given by way of illustration and should not be viewed as limiting. Also, many changes and modifications within the scope of the present embodiments may be made without departing from the spirit thereof, and the present invention includes such changes and modifications.

It will be apparent to those of ordinary skill in the art that methods involved in the system and method for modifying trading strategies based on message usage and/or exchange-based message usage policies may be embodied in a computer program product that includes one or more computer readable media. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

The invention claimed is:

1. A system comprising:
at least one trading device in communication with a gateway, wherein the at least one trading device includes a memory storing instructions executable by a processor, wherein the executed instructions provide:
sending a trade order message to a first electronic exchange for a first tradeable object;
transmitting a user input to define a predetermined range of prices for use by a trading strategy to the gateway;
a first electronic exchange in communication with the gateway, wherein the first electronic exchange includes a memory storing instructions executable by a processor, wherein the executed instructions provide:
sending market data changes in the first tradeable object to the gateway;

sending a predefined message usage threshold to the gateway, wherein the predefined message usage threshold is defined based on a threshold for message bandwidth;

a second electronic exchange in communication with the gateway, wherein the second electronic exchange includes a memory storing instructions executable by a processor, wherein the executed instructions provide:

sending market data changes in a second tradeable object to the gateway;

the gateway in communication with the at least one trading device, the first electronic exchange, and the second electronic exchange, wherein the gateway includes a memory storing instructions executable by a processor, wherein the executed instructions provide:

receiving, at a trading strategy unit, the user input from the at least one trading device to define the predetermined range of prices for use by the trading strategy, wherein the predetermined range of prices limits when the trading strategy generates and sends from the at least one trading device to the first electronic exchange a new trade order message for the first tradeable object at a new price to re-price an existing trade order pending at the first electronic exchange for the first tradeable object, wherein the existing trade order is a trade order for the first tradeable object, wherein the existing trade order is to be re-priced to maintain a desired strategy price based on market data changes in the second tradeable object compared to the first tradeable object;

receiving, at the trading strategy unit, the predefined message usage threshold from the first electronic exchange to define a message usage threshold for the trading strategy;

determining by a message use manager, a message usage associated with the trading strategy, wherein the message usage is based on a number of messages being sent by the trading strategy determined by a message counter, wherein the message use manager is configured to compare the message usage to the predefined message usage threshold to determine that the message usage exceeds the message usage threshold; and in response to the message use manager determining that the message usage exceeds the message usage threshold, increasing by the trading strategy the predetermined range of prices for use by the trading strategy, wherein the increased predetermined range of prices results in the trading strategy generating and sending fewer new trade order messages for the first tradeable object to re-price the existing trade order pending at the first electronic exchange for the first tradeable object based on market changes in the second tradeable object.

2. The system of claim 1, wherein the trading strategy comprises a spread trading strategy.

3. The system of claim 1, wherein the predetermined range of prices is defined based on a slop parameter.

4. The system of claim 3, wherein the slop parameter comprises at least one of an inside slop value and an outside slop value.

5. The system of claim 1, wherein the predefined message usage threshold is based on a number of messages being sent by the trading strategy.

6. The system of claim 1, wherein the predefined message usage threshold is based on a number of fills associated with trade orders corresponding to the trading strategy.

7. The system of claim 1, wherein the message usage is further determined based on a number of fills associated with trade orders corresponding to the trading strategy.

8. The system of claim 1, wherein the predefined message usage threshold is based on a fill percentage associated with trade orders corresponding to the trading strategy.

9. The system of claim 1, wherein the message usage is further determined based on a fill percentage associated with trade orders corresponding to the trading strategy.

10. The system of claim 1, wherein the message use manager is at a client entity.

11. The system of claim 1, wherein the message use manager is at a gateway.

12. The system of claim 1, wherein the predefined message usage threshold is user-defined.

13. The system of claim 1, wherein the message usage threshold is associated with a trading strategy application corresponding to the trading strategy.

14. The system of claim 13, wherein the trading strategy application comprises a spreader trading application.

15. The system of claim 1, wherein the trading strategy unit is configured to increase the predetermined range of prices for use by the trading strategy based on a predefined rule.

16. The system of claim 15, wherein the predefined rule gradually increases the predetermined range of prices over time based on a comparison of the message usage to the predefined message usage threshold before the message usage exceeds the message usage threshold.

17. The system of claim 1, wherein the predefined message usage threshold is selected from a plurality of predefined message usage thresholds set based on an exchange-defined message usage threshold.

18. The system of claim 17, wherein the plurality of predefined message usage thresholds is lower than the exchange-defined message usage threshold.

* * * * *